United States Patent
Takeshita

(10) Patent No.: US 7,283,667 B2
(45) Date of Patent: Oct. 16, 2007

(54) IMAGE PROCESSING UNIT, IMAGE PROCESSING METHOD, AND IMAGE PROCESSING PROGRAM

(75) Inventor: Tetsuya Takeshita, Yokohama (JP)

(73) Assignee: Nikon Corporation, Tokyo (JP)

( * ) Notice: Subject to any disclaimer, the term of this patent is extended or adjusted under 35 U.S.C. 154(b) by 888 days.

(21) Appl. No.: 10/354,008

(22) Filed: Jan. 30, 2003

(65) Prior Publication Data

US 2003/0151758 A1    Aug. 14, 2003

(30) Foreign Application Priority Data

Feb. 13, 2002   (JP)  ............................. 2002-035986
Jan. 8, 2003   (JP)  ............................. 2003-001752

(51) Int. Cl.
     *G06K 9/00*     (2006.01)
     *G06K 9/68*     (2006.01)

(52) U.S. Cl. .................................................. 382/168

(58) Field of Classification Search ................ 382/162, 382/164, 168, 170, 173, 272; 358/1.9, 515, 358/522, 530; 345/600–604; 348/223.1
See application file for complete search history.

(56) References Cited

U.S. PATENT DOCUMENTS

| | | | |
|---|---|---|---|
| 5,418,895 A | * | 5/1995 | Lee .............................. 345/604 |
| 5,619,347 A | | 4/1997 | Taniguchi et al. |
| 5,727,080 A | * | 3/1998 | Cox et al. ..................... 382/168 |
| 5,901,243 A | * | 5/1999 | Beretta ......................... 382/168 |
| 6,493,462 B1 | * | 12/2002 | Inoue .......................... 382/170 |
| 6,750,994 B1 | * | 6/2004 | Yamamoto .................. 358/522 |
| 6,845,176 B1 | * | 1/2005 | Sezan .......................... 382/168 |
| 6,995,791 B2 | * | 2/2006 | Skow ...................... 348/223.1 |
| 7,020,329 B2 | * | 3/2006 | Prempraneerach et al. . 382/164 |
| 2003/0151758 A1 | * | 8/2003 | Takeshita ..................... 358/1.9 |

FOREIGN PATENT DOCUMENTS

JP     A 11-205812     7/1999

\* cited by examiner

*Primary Examiner*—Amir Alavi
(74) *Attorney, Agent, or Firm*—Oliff & Berridge, PLC

(57) ABSTRACT

The present invention provides an image processing unit capable of differentiating two images with a difference which the user expects to see, an imaging processing method thereof, and an image processing program thereof. The image processing unit of the present invention includes: a histogram creation unit for creating a color histogram of each image obtained by an imaging sensor; a correlation calculation unit for comparing the color histogram of a processing object image to be subjected to predetermined processing with the color histogram of a comparison object image obtained prior to the processing object image, to calculate the color correlation between these images; and a decision unit for deciding a parameter to be used for the predetermined processing according to the calculated correlation.

19 Claims, 5 Drawing Sheets

IMAGE PROCESSING UNIT, IMAGE PROCESSING METHOD, AND IMAGE PROCESSING PROGRAM

BACKGROUND OF THE INVENTION

1. Field of the Invention

The present invention relates to an image processing unit to be mounted on or connected to a device such as an electronic camera. Further, the present invention relates to an image processing method and an image processing program which are applied to the image processing unit.

2. Description of the Related Art

An image processing circuit inside the conventional electronic camera automatically conducts white balance processing, color transformation processing, gray-scale transformation processing, and so on, on individual images.

Parameters, which are used for these processings, are decided for each of the processings according to color temperature, intensity, and the like of the individual images.

Therefore, if there exists even a slight difference between two images, even though they are obtained by photographing the same scene, different parameters are set for the above processings. This results in the individual images' having different finishes.

In general, however, when a user obtains two images by photographing the same scene twice consecutively, probably with slight framing changes, the two images will mostly have a little difference. In such a case, the user often hopes to have the two images with the same photographic atmosphere (particularly, color balance).

The aforesaid conventional electronic camera, however, may recognize a large difference between the two images, event though the user can see no difference therebetween, and as a result, these two images may have quite different photographic atmospheres.

SUMMARY OF THE INVENTION

Hence, it is an object of the present invention to provide an image processing unit, an image processing method, and an image processing program which realize creation of two images with a difference which the user expects to see.

An image processing unit of the present invention comprises a histogram creation unit for creating a color histogram of each image obtained by an imaging sensor; a correlation calculation unit for calculate color correlation between a processing object image and a comparison object image by comparing the color histograms of the two object images, the processing object image being subjected to a predetermined processing and the comparison object image being obtained prior to the processing object image; and a decision unit for deciding a parameter to be used for the predetermined processing according to the calculated correlation. In general, the human eyes easily recognize differences in colors of images when comparing a plurality of images. Deciding the parameter according to the color histogram makes it possible to differentiate the plurality of images with a difference which the user expects to see.

It is preferable that the histogram creation unit evaluates, when creating the color histogram, a color at each position on the image according to a hue area to which this color belongs. By way of this evaluation a plurality of images can be differentiated with a difference which the user expects to see.

The histogram creation unit preferably sets respective dimensions of the hue areas unequally. This realizes such image processing that a subtle difference in colors which appears a large difference to the human eyes is discriminated, on the other hand, a large difference in colors which appears a small difference to the human eyes is judged as equivalent.

The histogram creation unit preferably evaluates, when creating the color histogram, a color at each position on the image according to a hue area and a chroma area to which this color belongs.

The histogram creation unit preferably sets respective dimensions of the hue areas and/or chroma areas unequally. This realizes such image processing that a subtle difference in colors which appears a large difference to the human eyes is discriminated, on the other hand, a large difference in colors which appears a small difference to the human eyes is judged as equivalent.

The histogram creation unit preferably evaluates, when creating the color histogram, a frequency at which each color appears on the image. The evaluation is made for every area of the image consisting of a plurality of pixels. This shortens the time required for creation of the color histogram.

It is preferable that the image processing unit of the invention further comprises a tentative decision unit for tentatively deciding the parameter suitable for each of the images obtained by the imaging sensor, and the decision unit decide, according to the correlation, the parameter to be used by applying weighted average to the tentatively decided parameter for the processing object image and the tentatively decided parameter for the comparison object image. This makes it possible to reflect the colors of the processing object image and of the comparison object image, and the correlation between the two images in the parameter.

The correlation calculation unit preferably calculates, as an index of the correlation, a Euclidean distance between a vector of the frequency at which each color appears in the color histogram of the processing object image and a vector of the frequency at which each color appears in the color histogram of the comparison object image. This realizes reliable calculation of the correlation.

Moreover, the histogram creation unit preferably excludes an area of the image from objects of color evaluation for creation of the color histogram when the area has a color being outside a predetermined color area. This can prevent a distinctive color from having influence on the parameter even in a case only one of the processing object image and the comparison object image includes the distinctive color.

An image processing method of the present invention comprises: a histogram creation step of creating a color histogram of each image obtained by an imaging sensor; a correlation calculation step of calculating color correlation between a processing object image and a comparison object image by comparing the color histograms of the two object images, the processing object image being subjected to a predetermined processing and the comparison object image being obtained prior to the processing object image for comparison; and a decision step of deciding a parameter to be used for the predetermined processing according to the calculated correlation. The human eyes are generally sensitive to differences in colors of images when comparing a plurality of images. This way of deciding the parameter based on the color histogram makes it possible to differentiate the plurality of images with a difference which the user expects to see.

Preferably, in the histogram creation step, a color at each position on the image is evaluated for the creation of the color histogram, according to a hue area to which this color belongs.

In the histogram creation step, respective dimensions of the hue areas are preferably set unequally. This realizes such image processing that a subtle difference in colors which appear a large difference to the human eyes is discriminated, on the other hand, a large difference in colors which appears a small difference to the human eyes is judged as equivalent.

In the histogram creation step, when the color histogram is created, a color at each position on the image is preferably evaluated based on a hue area and a chroma area to which this color belongs.

In the histogram creation step, respective dimensions of the hue areas and/or of chroma areas are preferably set unequally. This realizes such image processing that a subtle difference in colors which appears a large difference to the human eyes is discriminated, on the other hand, a large difference in colors which appears a small difference to the human eyes is judged as equivalent.

In the histogram creation step, when the color histogram is created, a frequency at which each color appears on the image is preferably evaluated for each area consisting of a plurality of pixels. This shortens the time required for creating the color histogram.

It is preferable that the image processing method further comprises a tentative decision step of tentatively deciding the parameter suitable for each of the images obtained by the imaging sensor. In the decision step, the parameter to be used is decided according to the correlation by applying weighted average to the tentatively decided parameter for the processing object image and the tentatively decided parameter for the comparison object image. This makes it possible to properly reflect the colors of the processing object image and of the comparison object image, and the correlation between the two images in the parameter.

Preferably in the correlation calculation step, as an index of the correlation calculated is a Euclidean distance between a vector of the frequency at which each color appears in the color histogram of the processing object image and a vector of the frequency at which each color appears in the color histogram of the comparison object image. This realizes reliable calculation of the correlation.

In the histogram creation step, an area on the image is preferably excluded from objects of color evaluation for creation of the color histogram when the area has a color outside a predetermined color area. This can prevent a distinctive color from affecting the parameter even in a case only one of the processing object image and the comparison object image includes the distinctive color.

An image processing program of the present invention causes an image processing unit to execute the steps of: creating a color histogram of each image obtained by an imaging sensor; calculating color correlation between a processing object image and a comparison object image by comparing the color histograms of the two images, the processing object image being subjected to a predetermined processing and the comparison object image being obtained prior to the processing object image for comparison; deciding a parameter to be used for the predetermined processing according to the calculated correlation. This image processing program is capable of causing the image processing unit to execute processing by the image processing method of the present invention.

As described hitherto, the present invention realizes an image processing unit which can differentiate a plurality of images with a difference which the user expects to see, and an image processing method and an image processing program thereof.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, an embodiment of the present invention will be explained with reference to the drawings.

Figure 1:
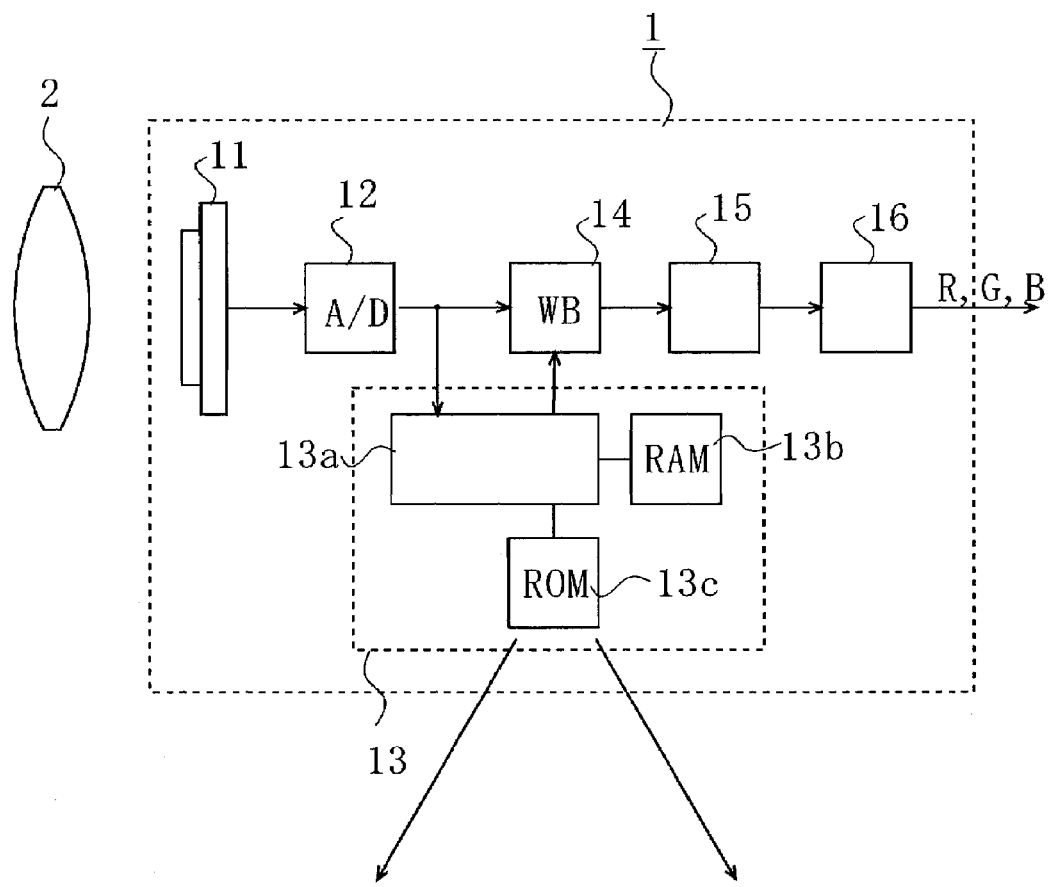
FIG. 1 is a view showing a schematic configuration of an electronic camera of an embodiment.

FIG. 1 is a view showing a schematic configuration of an electronic camera of this embodiment.

A camera body 1 is provided with an imaging sensor 11, an A/D converter 12, a white balance processing circuit 14, a color interpolation circuit 15, a gray-scale transformation circuit 16, a setting circuit 13, and so on.

An image of a subject is formed through a lens 2 on the imaging sensor 11. An output signal of the imaging sensor 11 is inputted to the A/D converter 12 via a not-shown analog gain controller to be converted to a digital signal. The digital signal undergoes white balance processing in the white balance processing circuit 14, a color interpolation processing in the color interpolation circuit 15, and a gray-scale transformation processing in the gray-scale transformation circuit 16, respectively.

Here, the setting circuit 13 sets for each image a gain (hereinafter, defined as Gr, Gb) by which the white balance processing circuit 14 multiplies the digital signals (hereinafter, defined as R/G, B/G). This setting circuit 13 corresponds to what characterizes the present invention.

Note that the reference symbol 13a in FIG. 1 denotes an operating circuit in the setting circuit 13, the reference symbol 13b denotes a RAM used for processing thereof, and the reference symbol 13c denotes a ROM used for this processing.

In the ROM 13c, various kinds of the gains (Gr, Gb) to be set for the white balance processing circuit 14 are stored in advance.

Various kinds of gains $(Gr_1, Gb_1)$, $(Gr_2, Gb_2)$, . . . are, for example, stored in advance in the ROM 13c in the form of color temperature-gain table such as (13c-1) in FIG. 1, in correspondence with color temperature of an image.

In the ROM 13c of this embodiment, an 'alienation-weight table' (to be described later) such as (13c-2) in FIG. 1 is also stored in advance.

In the conventional processing, however, the color temperature of each image is obtained, thereafter its corresponding gain (Gr, Gb) for each image obtained in reference with the color temperature-gain table is only sent to the white balance processing circuit 14 for the setting.

Figure 2:
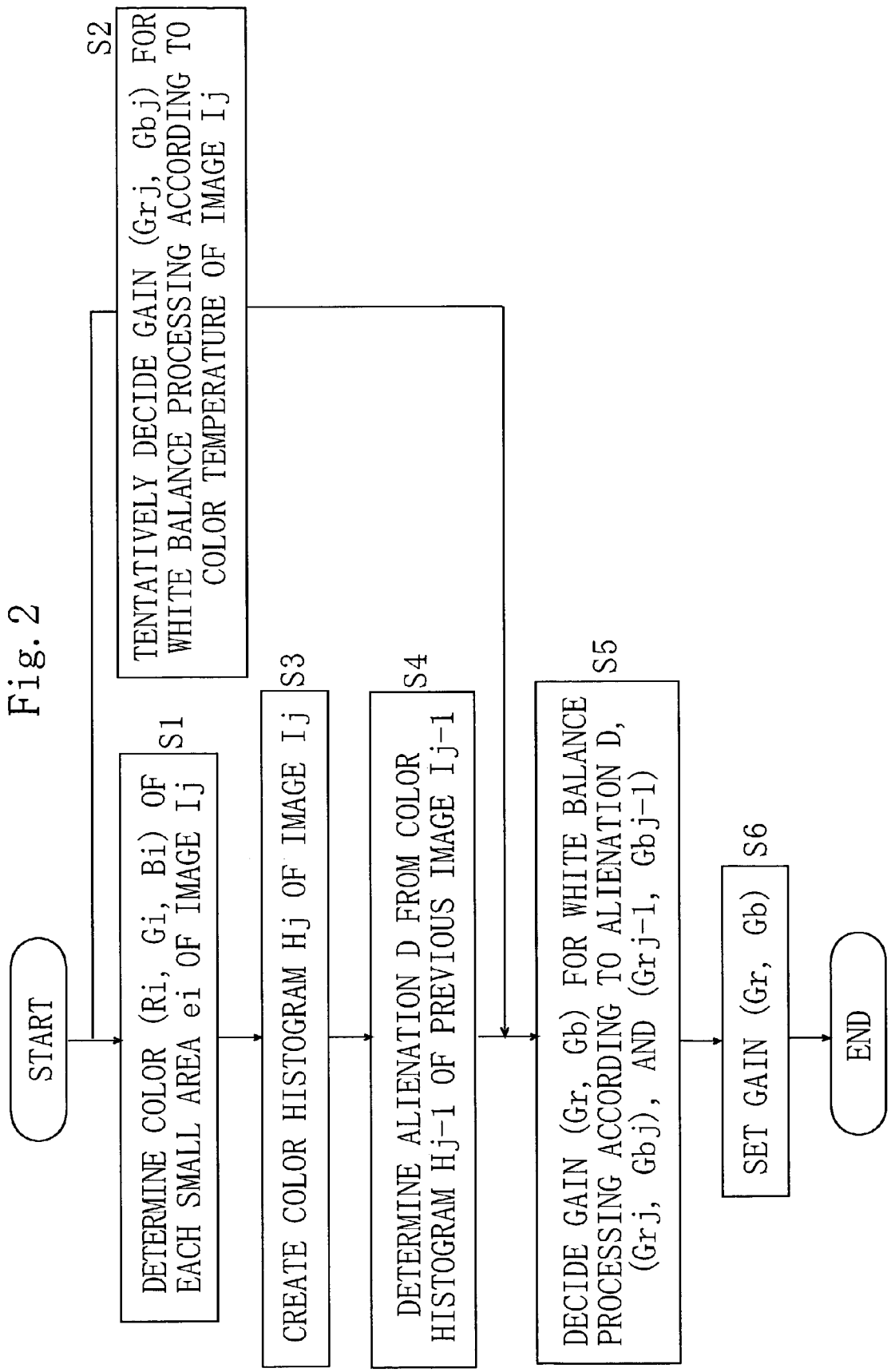
FIG. 2 is an operational flow chart of a setting circuit 13.

FIG. 2 is an operational flow chart of the setting circuit 13.

Note that only processing for the jth ($j \leq 2$) obtained image $I_j$ is shown in this operational flow chart.

The gain (Gr, Gb) is set for the first image $I_1$ similarly to the conventional art. Further, the gain $(Gr_1, Gb_1)$ thereof and a color histogram $H_1$ (refer to Steps S1, S3 described below for the obtaining method thereof) of the image $I_1$ are stored in the RAM 13b as necessary information for the processing on a subsequent second image $I_2$.

Figure 3:
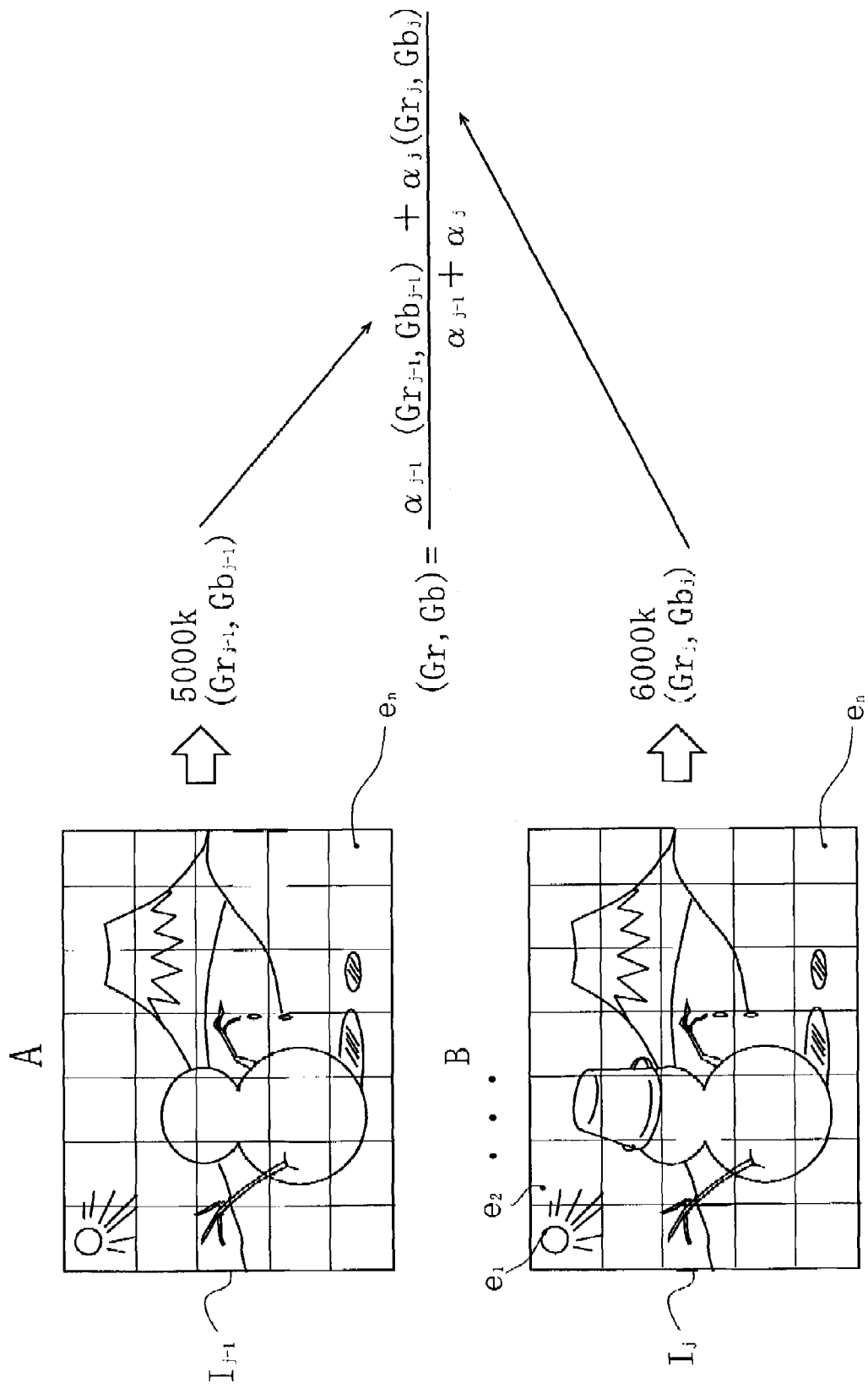
FIG. 3 is a view showing the outline of the embodiment.

In this embodiment, as shown in FIG. 3, the gain $(Gr_j, Gb_j)$ for the image $I_j$ is decided not only according to this image $I_j$ (B in FIG. 3) but also according to the correlation between the image $I_j$ and an image $I_{j-1}$, (A in FIG. 3).

In Step S1 in FIG. 2, each color $(R_i, G_i, B_i)$ of small areas $e_i$ (i=1 to n, and in n=35 in FIG. 3) in the image $I_j$ is obtained. Here, since each of the small areas $e_i$ consists of a plurality of pixels, the color $(R_i, G_i, B_i)$ thereof can be defined as the total value (or the average value) of the respective pixel values in the small area $e_i$.

Further, in Step S2, the color temperature of the image $I_j$ is obtained in a fashion similar to the conventional technique, and the gain $(Gr_j, Gb_j)$ is tentatively decided based on the color temperature-gain table in the ROM 13c.

Further, in Step S3, the color histogram $H_j$ of the image $I_j$ is created based on the color $(R_i, G_i, B_i)$ (i=1 to 35) of each of the small areas $e_i$ obtained in Step S1. In this embodiment, the color histogram $H_j$ is used for judging the correlation between the image $I_j$ and the Image$_{j-1}$.

At comparing a plurality of images, in general, the human eyes are sensitive to differences in colors, so that the judgment made based on the color histogram is close to that of the human eyes.

Figure 4:
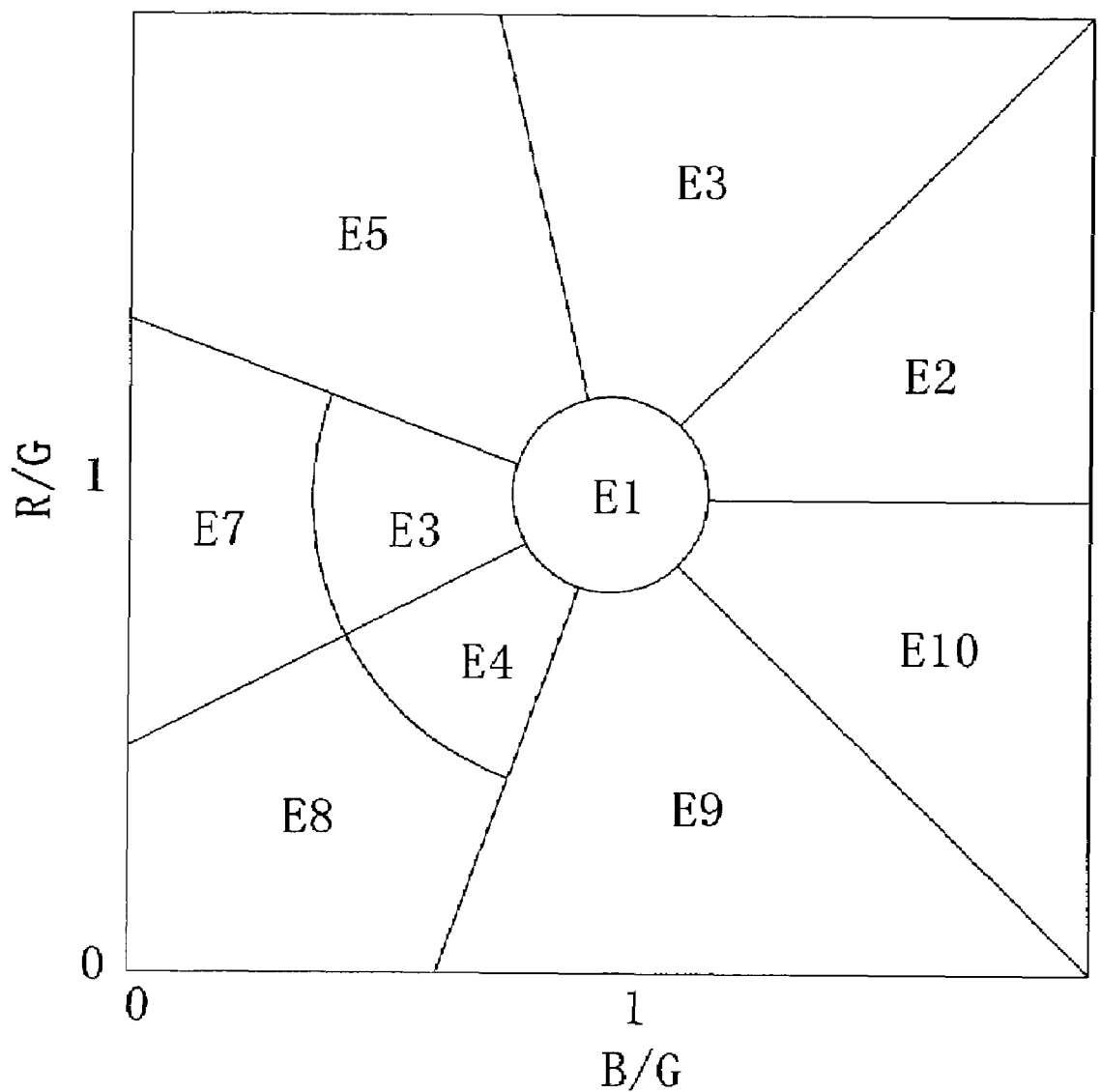
FIG. 4 is a color diagram.

FIG. 4 is a color diagram.

For creation of the color histogram, which color area of the color diagram each color $(R_i, G_i, B_i)$ of the respective small areas $e_j$ belongs to is determined, and the frequency at which each color appears is counted for every color area.

Here, for example, the color areas are differently positioned in a hue direction of the color diagram (namely, a circumferential direction of a circle with (R/G, B/G)=(1, 1) being its center).

The human eyes are also sensitive to a chroma direction to some degree, so that it is preferable to provide several color areas in the chroma direction (namely, a diameter direction of the circle with (R/G, B/G)=(1, 1) being its center), as shown in FIG. 4.

In addition, it is preferable that the respective dimensions of the color areas in the hue direction and in the chroma direction are set unequally. This is because it is preferable to discriminate with reliability colors which have a subtle difference from each other but appears quite different to the human eyes, while colors having a large difference from each other but appearing slightly different to the human are preferably judged as equivalent.

In the example shown in FIG. 4, in the chroma direction provided are a plurality of color areas close to a green color (lower left of the color diagram) (consequently, each of the dimensions thereof in the chroma direction is relatively narrow).

This enables green with a low chroma (such as artificial color of a fluorescent lamp) and green with a high chroma (such as natural color of a plant) to be included in different color areas. As a result, the artificial green and the natural green are discriminated.

Figure 5A:
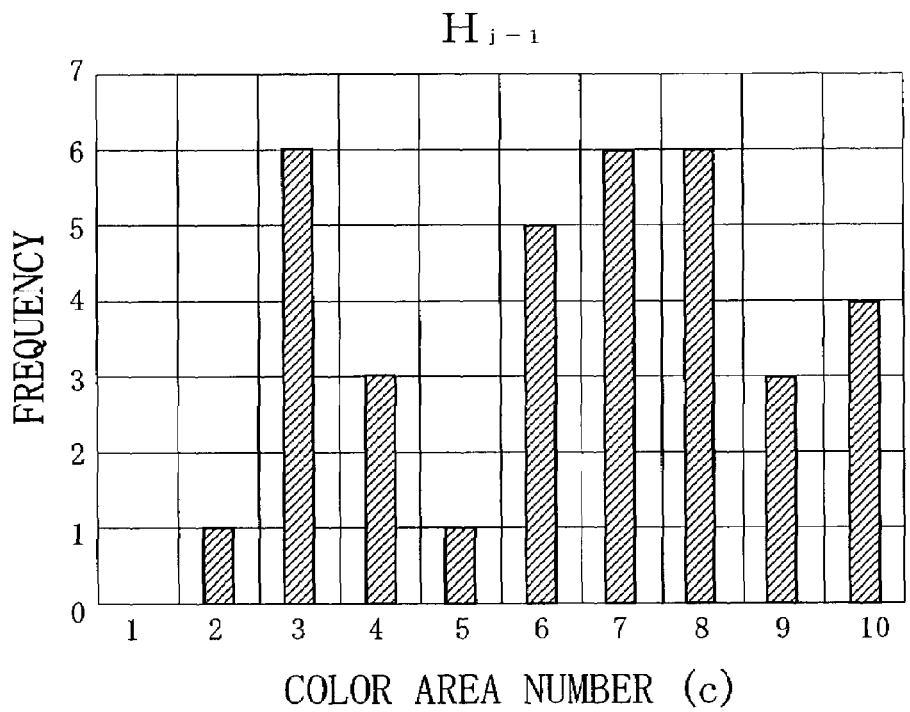
FIG. 5B is a color histogram $H_j$ of an image $I_j$ and FIG. 5A is a color histogram $H_{j-1}$ of an image $I_{j-1}$.
Figure 5B:
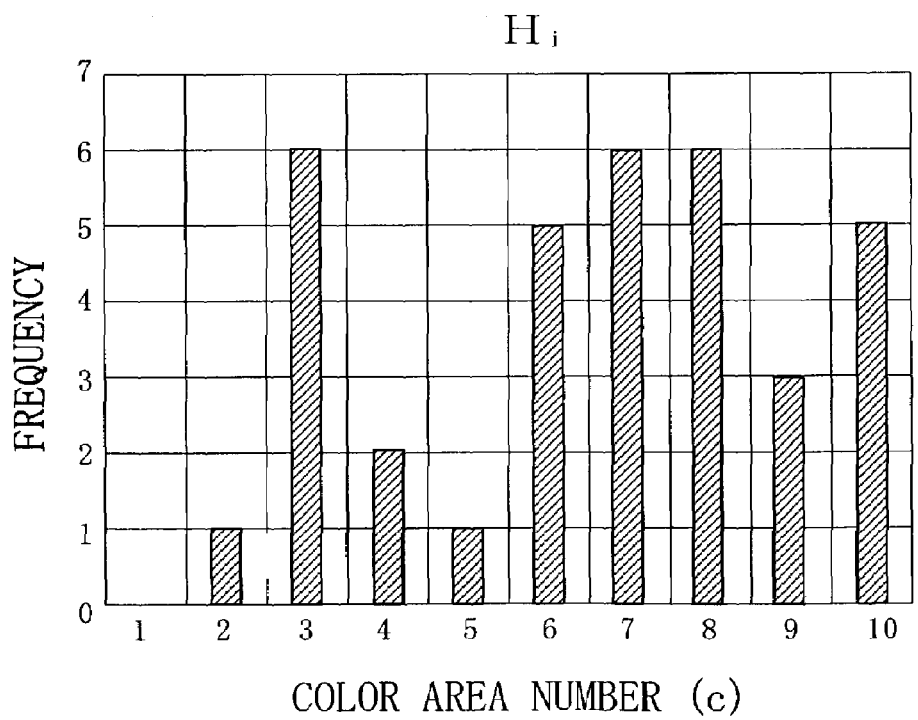

FIG. 5B is the color histogram $H_j$ of the image $I_j$ created in the manner described above.

Note that at this instant the RAM 13b already has the color histogram $H_{j-1}$ of the previous image $I_{j-1}$ and the gain $(Gr_{j-1}, Gb_{j-1})$ tentatively decided for this image $I_{j-1}$ stored therein.

FIG. 5A is the color histogram $H_{j-1}$ of the image $I_{j-1}$.

In Step S4 in FIG. 2 obtained is the correlation between the color histogram $H_j$ (FIG. 5B) of the image $I_j$ created in Step S3 and the color histogram $H_{j-1}$ (FIG. 5A) of the image $I_{j-1}$ stored in the RAM 13b.

An index of the correlation is, for example, a Euclidean distance (hereinafter, referred to as 'alienation') D between a vector of each frequency at which each color appears in the color histogram $H_j$ and a vector of each frequency at which each color appears in the color histogram $H_{j-1}$ (Formula (1)).

$$D = \sqrt{\sum_{c=1}^{10} (H_{j-1}(c) - H_j(c))^2} \quad (1)$$

Here, "c" in the formula signifies the number (1 to 10) of the color areas in the color diagram.

The smaller this alienation D is, the higher the correlation between the color of the image $I_j$ and the color of the previous image $I_{j-1}$ is.

Then, in Step S5 in FIG. 2, the gain (Gr, Gb) to be used for the image $I_j$ is decided according to this alienation D, the gain $(Gr_j, Gb_j)$ tentatively decided for the image $I_j$ in Step S2, and the gain $(Gr_{j-1}, Gb_{j-1})$ tentatively decided for the previous image $I_{j-1}$.

At this time, the weighted average is applied to the gain $(Gr_j, Gb_j)$ and the gain $(Gr_{j-1}, Gb_{j-1})$ according to the alienation D with reference to the 'alienation-weight table' shown in FIG. 1 (13c-2). This table stores weights $\alpha_{j-1}, \alpha_j$ by which the gain $(Gr_{j-1}, Gb_{j-1})$ and the gain $(Gr_j, Gb_j)$ are to be multiplied, in correspondence with the respective alienations D.

Here, the contents of this table are determined in advance such that the smaller the alienation D becomes, the closer to the gain $(Gr_{j-1}, Gb_{j-1})$ the gain (Gr, Gb) after the averaging becomes, and that the larger the alienation D becomes, the closer to the gain $(Gr_j, Gb_j)$ the gain (Gr, Gb) after the averaging becomes.

The setting circuit 13 decides the value of the gain (Gr, Gb) by applying the weighted average by the formula (2) (this corresponds to Step S5) and sets this value for the white balance processing circuit 14 (Step S6).

$$(Gr, Gb) = \frac{\alpha_{j-1}(Gr_{j-1}, Gb_{j-1}) + \alpha_j(Gr_j, Gb_j)}{\alpha_{j-1} + \alpha_j} \quad (2)$$

Note that at the time the processing hitherto is finished, the color histogram $H_j$ and the gain $(Gr_j, Gb_j)$ of the image $I_j$ are stored in the RAM 13b to replace the color histogram $H_{j-1}$ and the gain $(Gr_{j-1}, Gb_{j-1})$ of the image $I_{j-1}$.

Thereafter, the white balance processing circuit 14 in FIG. 1 performs white balance processing on the image $I_j$, using the gain (Gr, Gb).

In this embodiment, as described above, the correlation between the image $I_j$ and the image $I_{j-1}$ is determined according to the color histogram, and a parameter (gain (Gr, Gb)) for the white balance processing on the image $I_j$ is decided according to this correlation.

As described above, since the human eyes are sensitive to color differences, this way of deciding based on the color histogram can differentiate the image $I_{j-1}$ and the image $I_j$ in white balance in a similar way that the human eyes do.

Incidentally, the evaluation of the color of each of the small areas $e_i$ in the aforesaid Step S1 in this embodiment may also be made in the following manner.

First, when there exists a pixel having a distinctive color (for example, a primary color) on the image, the pixel is excluded from objects of color evaluation.

Specifically, the color of the small area $e_i$ including the pixel having the distinctive color is recognized as the total value (or the average value) of pixels except the pixel having the distinctive color.

In this way, the correlation will not be lower (the alienation D will not be higher) even when only one of the image $I_j$ and the image $I_{j-1}$ includes the distinctive color, since the distinctive color is ignored.

In a case where a part of one of the image $I_j$ and the image $I_{j-1}$ contains the distinctive color but most of the areas of the image $I_j$ and the image $I_{j-1}$ are similar to each other, the human eyes usually recognizes the two images as equivalent. Therefore, it can be said that the correlation is determined in a similar way that the human eyes do.

Incidentally, in the above-described embodiment, the number of the combinations of the weights $(\alpha_{j-1}, \alpha_j)$ is five, namely, (10, 0), (8, 2), . . . (0,10), in accordance with the levels of the alienation D as shown in FIG. 1 (13c-2), but it may be a different number (for example, 2). For reference, when the number is two and the alienation D has a value smaller than a predetermined value, $(\alpha_{j-1}, \alpha_j)$, will be (1, 0), and when the alienation D has a value equal to or larger than the predetermined value, $(\alpha_{j-1}, \alpha_j)$ will be (0, 1).

Further, in the above-described embodiment, the objects of the weighted average are the gain $(Gr_{j-1}, Gb_{j-1})$ of the image $I_{j-1}$ and the gain $(Gr_j, Gb_j)$ of the image $I_j$, but they may be the color temperatures of the image $I_{j-1}$ and of the image $I_j$.

In this case, the gain (Gr, Gb) is stored in the 'color temperature-gain table' in advance, in correspondence with the color temperature after the weight averaging. The gain (Gr, Gb) is set for the white balance processing circuit 14.

Moreover, in the above-described embodiment, the parameter set according to the correlation is the parameter (gain (Gr, Gb)) for the white balance processing, but it may be a parameter for the gray-scale transformation processing (gray-scale transformation curve) and a parameter for color transformation processing (color transformation matrix).

Further, in the above-described embodiment, the gain tentatively decided for a certain image is used for deciding the gain for its subsequent image but an actually set gain may be used.

In this case, especially when the electronic camera is in a continuous exposure mode, it is highly likely that the correlation between continuously obtained images is sufficiently high. Namely, the weights $(\alpha_{j-1}, \alpha_j)$ are likely to be (1, 0) (in other words, the value of the tentatively decided gain $(Gr_j, Gb_j)$ is not required for the operation of the weighted average). Hence, a part of the operational flow chart in FIG. 2 may be modified such that Step S2 (the step of tentatively deciding $(Gr_j, Gb_j)$) in FIG. 2 is executed only when necessary.

Moreover, the above-described embodiment describes a case where the present invention is applied to the electronic camera, but the present invention is applicable to other devices on which an image processing circuit is mounted, for example, a scanner.

It is also possible to constitute an image processing program comprising the steps (FIG. 2) described in the above embodiment (a program executable by an image processing device such as a computer).

The invention is not limited to the above embodiments and various modifications may be made without departing from the spirit and scope of the invention. Any improvement may be made in part or all of the components.

What is claimed is:

1. An image processing unit comprising:
   a histogram creation unit for creating respective color histograms of images obtained by an imaging sensor;
   a correlation calculation unit for calculate color correlation between a processing object image and a comparison object image by comparing color histograms of the two object images, the processing object image being one of said images and to be subjected to a predetermined processing, the comparison object image being another one of said images, and obtained prior to the processing object image; and
   a decision unit for deciding a parameter according to the calculated correlation, the parameter being used for said predetermined processing.

2. The image processing unit according to claim 1, wherein
   said histogram creation unit evaluates, for creation of said color histograms, a color at each position of each of said images according to a hue area to which the color belongs.

3. The image processing unit according to claim 2, wherein
   said histogram creation unit sets respective dimensions of hue areas unequally.

4. The image processing unit according to claim 1, wherein
   said histogram creation unit evaluates, for creation of said color histograms, a color at each position of each of said images according to a hue area and a chroma area to which the color belongs.

5. The image processing unit according to claim 4, wherein
   said histogram creation unit sets respective dimensions of hue areas and/or chroma areas unequally.

6. The image processing unit according to claim 1, wherein
   said histogram creation unit evaluates, for creation of said color histograms, a frequency at which each color appears on said image, the evaluation being made for every area of said image, the area consisting of a plurality of pixels.

7. The image processing unit according to claim 6, further comprising
   a tentative decision unit for tentatively deciding said parameter for each of said images obtained by said imaging sensor, the parameter being suitable for each of said images, wherein
   said decision unit decides, according to said correlation, said parameter to be used by applying weighted average to a tentatively decided parameter for said processing object image and a tentatively decided parameter for said comparison object image.

8. The image processing unit according to claim 7, wherein
   said correlation calculation unit calculates, as an index of said correlation, a Euclidean distance between a vector of the frequency at which each color appears in the color histogram of said processing object image and a vector of the frequency at which each color appears in the color histogram of said comparison object image.

9. The image processing unit according to claim 8, wherein said histogram creation unit excludes an area of said image from objects of evaluation for creation of said color histograms, when the area has a color being outside a predetermined color area.

10. An image processing method comprising the steps of:

creating respective color histograms of images obtained by an imaging sensor;

calculating color correlation between a processing object image and a comparison object image by comparing color histograms of the two images, the processing object image being one of said images and to be subjected to a predetermined processing, the comparison object image being another one of said images, and obtained prior to the processing object image for comparison; and deciding a parameter according to the calculated correlation, the parameter being used for said predetermined processing.

11. The image processing method according to claim 10, wherein in the histogram creation step, a color at each position of each of said images is evaluated for creation of said color histograms, according to a hue area to which the color belongs.

12. The color processing method according to claim 11, wherein in the histogram creation step respective dimensions of hue areas are set unequally.

13. The image processing method according to claim 10, wherein in the histogram creation step, a color at each position of each of said images is evaluated for creation of said color histograms, according to a hue area and a chroma area to which the color belongs.

14. The image processing method according to claim 13, wherein in the histogram creation step, respective dimensions of hue areas and/or chroma areas are set unequally.

15. The image processing method according to claim 10, wherein in the histogram creation step, a frequency at which each color appears on said image is evaluated for creation of said color histograms, the evaluation being made for every area of said image, the area consisting of a plurality of pixels.

16. The image processing method according to claim 15, further comprising the step of tentatively deciding said parameter for each of the images obtained by said imaging sensor, the parameter being suitable for each of said images, wherein in the decision step, said parameter to be used is decided by applying weighted average, according to said correlation, to the tentatively decided parameter for the processing object image and the tentatively decided parameter for said comparison object image.

17. The image processing method according to claim 16, wherein in the correlation calculation step, a Euclidean distance between a vector of the frequency at which each color appears in the color histogram of said processing object image and a vector of the frequency at which each color appears in the color histogram of said comparison object image is calculated as an index of said correlation.

18. The image processing method according to claim 17, wherein in the histogram creation step, an area of said image is excluded from objects of evaluation for creation of said color histograms, when the area has a color being outside a predetermined color area.

19. A computer-readable storage medium that stores an image processing computer program causing a computer unit to execute the steps of:

creating respective color histograms of images obtained by an imaging sensor;

calculating color correlation between a processing object image and a comparison object image by comparing color histograms of the two images, the processing object image being one of said images and to be subjected to a predetermined processing, the comparison object image being another one of said images, and obtained prior to the processing object image; and deciding a parameter according to the calculated correlation, the parameter being used for said predetermined processing.

* * * * *